US012639229B2

(12) United States Patent (10) Patent No.: US 12,639,229 B2
Haberstro et al. (45) Date of Patent: *May 26, 2026

(54) ATOMIC SMASHING

(71) Applicant: Apple Inc., Cupertino, CA (US)

(72) Inventors: Jedd O. Haberstro, Acton, MA (US);
Mladen Wilder, Cambridge (GB)

(73) Assignee: Apple Inc., Cupertino, CA (US)

( * ) Notice: Subject to any disclaimer, the term of this
patent is extended or adjusted under 35
U.S.C. 154(b) by 0 days.

This patent is subject to a terminal dis-
claimer.

(21) Appl. No.: 18/960,603

(22) Filed: Nov. 26, 2024

(65) Prior Publication Data

US 2025/0086116 A1 Mar. 13, 2025

Related U.S. Application Data

(63) Continuation of application No. 18/342,509, filed on
Jun. 27, 2023, now Pat. No. 12,182,026.

(51) Int. Cl.
*G06F 12/0891* (2016.01)
*G06F 12/0842* (2016.01)
(52) U.S. Cl.
CPC ...... *G06F 12/0891* (2013.01); *G06F 12/0842*
(2013.01)
(58) Field of Classification Search
None
See application file for complete search history.

(56) References Cited

U.S. PATENT DOCUMENTS

2010/0318747 A1* 12/2010 Abts ................... G06F 12/0815
711/144
2011/0289510 A1* 11/2011 Lin ....................... G06F 9/3004
718/106

(Continued)

FOREIGN PATENT DOCUMENTS

JP 6918051 B2 8/2021

OTHER PUBLICATIONS

International Search Report and Written Opinion in PCT Appl. No.
PCT/US2024/025635 mailed Aug. 14, 2024, 9 pages.

*Primary Examiner* — Arpan P. Savla
*Assistant Examiner* — Edmund H Kwong
(74) *Attorney, Agent, or Firm* — Kowert, Hood, Munyon,
Rankin & Goetzel, P.C.; Michael B. Davis; Dean M.
Munyon

(57) ABSTRACT

Techniques are disclosed relating to smashing atomic opera-
tions. In some embodiments, cache control circuitry caches
data values in cache storage circuitry and receive multiple
requests to atomically update a cached data value according
to one or more arithmetic operations. The control circuitry
may perform updates to a cached data value based on the
multiple requests, in response to determining that the one or
more arithmetic operations meet one or more criteria and
store operation information that indicates a most-recent
requested atomic arithmetic operation for the updated data
value. The control circuitry may, in response to an event,
flush, to a higher level in a memory hierarchy that includes
the cache storage circuitry both: the updated data value and
the operation information. This may advantageously smash
atomic operations at the cache and reduce operations to the
higher-level cache or memory (which may be the actual
coherence point for atomic requests).

20 Claims, 9 Drawing Sheets

(56)          References Cited

U.S. PATENT DOCUMENTS

| | | |
|---|---|---|
| 2014/0195737 A1 | 7/2014 | Lilly et al. |
| 2015/0032970 A1 | 1/2015 | Francis et al. |
| 2015/0046655 A1 | 2/2015 | Nystad et al. |
| 2015/0378899 A1 | 12/2015 | Busaba et al. |
| 2017/0153975 A1 | 6/2017 | Chadwick et al. |
| 2017/0351441 A1 | 12/2017 | Marinescu |
| 2018/0300846 A1 | 10/2018 | Ray et al. |
| 2019/0236010 A1 | 8/2019 | Yoo et al. |
| 2019/0258574 A1 | 8/2019 | Parker et al. |
| 2019/0332529 A1 | 10/2019 | Syrne et al. |
| 2022/0414013 A1 | 12/2022 | Alsop et al. |
| 2023/0205523 A1* | 6/2023 | Kalyanasundharam .................... G06F 9/30029 712/225 |
| 2024/0087077 A1 | 3/2024 | Ray et al. |

* cited by examiner

Vertex Data

Processing Flow 100

Graphics Unit 150

*Example*
*metadata*
*306*

| Atomic?<br>410 | Type<br>420 | Operation<br>430 | Validity<br>440 |
|---|---|---|---|

*FIG. 4*

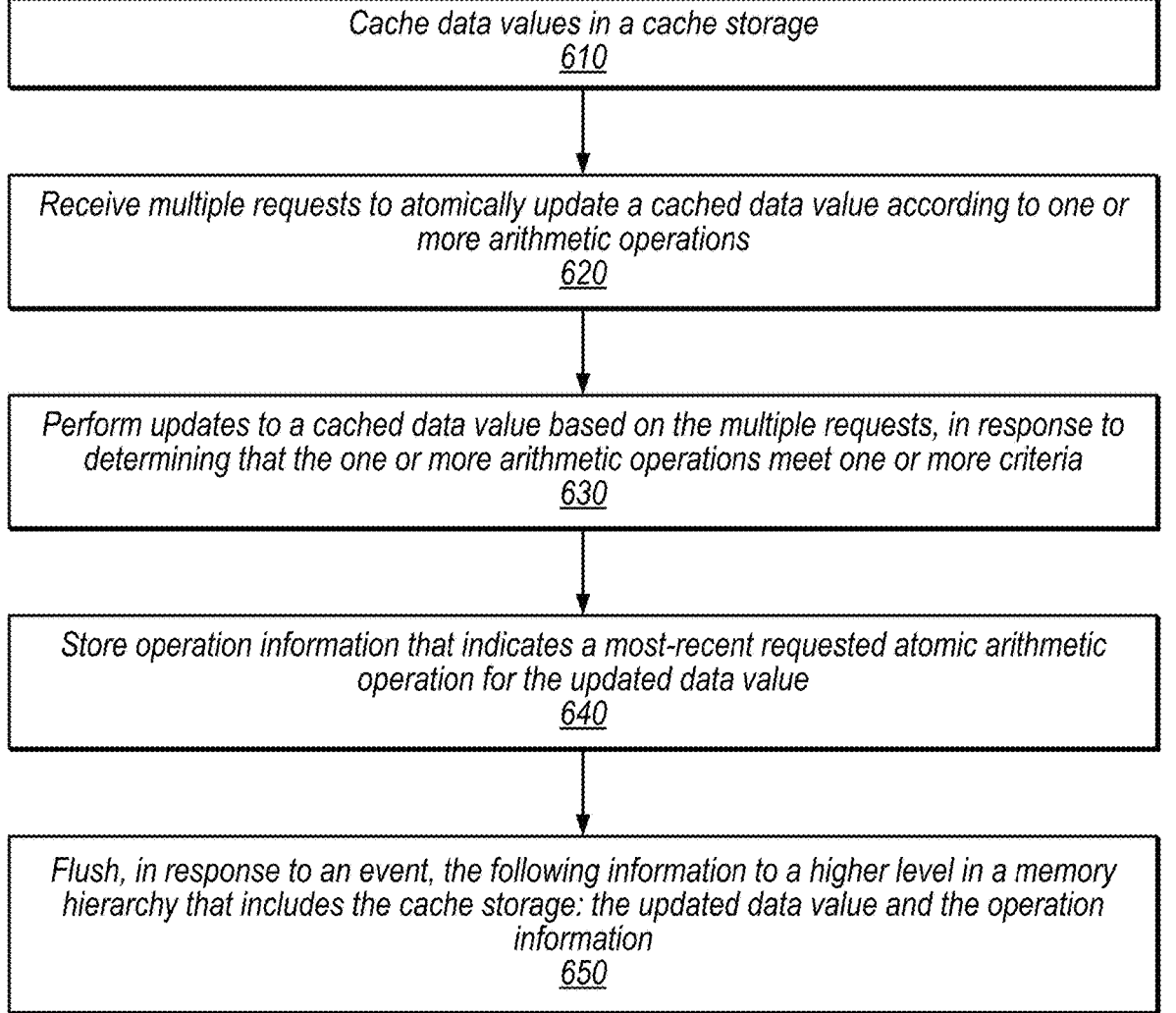

Cache data values in a cache storage
610

Receive multiple requests to atomically update a cached data value according to one or
more arithmetic operations
620

Perform updates to a cached data value based on the multiple requests, in response to
determining that the one or more arithmetic operations meet one or more criteria
630

Store operation information that indicates a most-recent requested atomic arithmetic
operation for the updated data value
640

Flush, in response to an event, the following information to a higher level in a memory
hierarchy that includes the cache storage: the updated data value and the operation
information
650

FIG. 6

ATOMIC SMASHING

The present application is a continuation of U.S. application Ser. No. 18/342,509, entitled "Computer Processor Architecture for Coalescing of Atomic Operations," filed Jun. 27, 2023, the disclosure of which is incorporated by reference herein in its entirety.

BACKGROUND

Technical Field

This disclosure relates generally to computer processor architecture and more particularly to handling atomic operations.

Description of Related Art

In distributed processors (e.g., graphics processors), different cores may send atomic operation requests. A given atomic request may include an arithmetic operation to be performed on the data at the target location. Different threads may send atomic requests to the same region of memory (e.g., corresponding to a cache line). Some atomic requests are "without return," such that the requesting thread does not need to immediately observe the new value after the operation is complete.

BRIEF DESCRIPTION OF DRAWINGS

FIG. 4 is a diagram illustrating example metadata fields, according to some embodiments.

FIG. 6 is a flow diagram illustrating an example method, according to some embodiments.

DETAILED DESCRIPTION

Figure 1A:
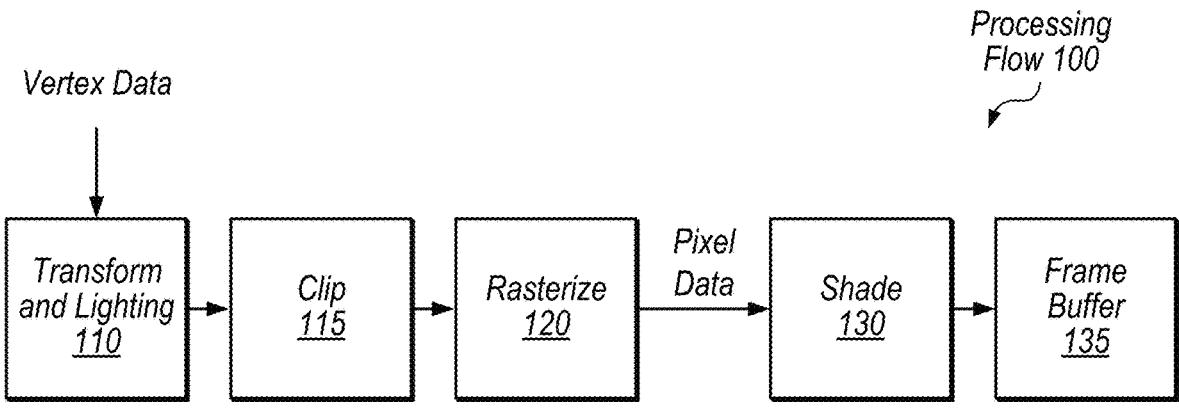
FIG. 1A is a diagram illustrating an overview of example graphics processing operations, according to some embodiments.

In disclosed embodiments discussed in detail below, control circuitry is configured to accumulate multiple atomic requests to the same memory region before making the results available to requester(s) (e.g., by flushing to a coherence point). In the relaxed memory ordering context, the control circuitry may accumulate the result until an event occurs that triggers the control circuitry to make the value coherent (e.g., the result is accessed or an atomic operation whose order affects correctness is encountered). This coalescing may be referred to as "atomic smashing."

The atomic requests may be heterogeneous in various aspects. For example, the requests may be from different threads (heterogeneity in space) and occur at different times (heterogeneity in time). In the parallel processing context, heterogeneity in space may include smashing requests from different single-instruction multiple-data (SIMD) groups and even from different programs/shaders (e.g., different dispatches or different threadgroups running different shaders).

Atomic Operations, Coherence, and Relaxed Memory Ordering

The following paragraphs provide additional information regarding atomic operations, coherency, and relaxed memory ordering, according to some embodiments. Atomic smashing may be implemented in this context, in some embodiments.

Various programming languages and application programming interfaces (APIs) support atomic operations. For example, the Metal shading language (MSL) provides atomic functions such as store, load, exchange, fetch and modify (e.g., with add, and, max, min, bitwise or, subtract, and exclusive or operations), and modify (e.g., with max and min operations). Generally, an "atomic" operation is executed without other processes or threads being able to read or change state of data changed by the operation. Thus, from the requester's point of view, the actions of an atomic operation (e.g., read data value, perform one or more operations that use the data value as an input, and store result) are performed as a single step. For atomic requests without return, the requester (e.g., a graphics shader program) does not immediately receive the result of the atomic operation (although it may eventually observe the result based on other instructions that access the location that stores the result).

Atomic functions may have different scopes, e.g., local atomics and device atomics. The coherence points for different scopes may differ. As one example, a lower-level shader cache may be the coherence point for local atomics while a higher-level cache (which may be shared by multiple cores) may be the coherence point for device atomics. In some implementations, coherence control circuitry may provide coherence among multiple caches at a given level, e.g., using snoop mechanisms, directory mechanisms, etc. Various atomic scopes may be implemented in different embodiments.

Relaxed memory models impose fewer constraints on the order of memory operations than strict memory models (e.g., that require sequential consistency). In relaxed models, younger memory operations may be performed earlier than older memory operations in certain scenarios, subject to any explicit synchronization directives.

Many mathematical operators supported by relaxed memory order atomics are binary associative and thus form a monoid when paired with an identity element. This identity element allows for the operations to be performed independent of prior operations (and thus independent of a coherent view of memory) and later combined without affecting correctness. For example, the table below provides identity values for certain arithmetic operations:

| Operator | Identity |
| --- | --- |
| Add | 0 |
| Subtract | 0 |
| UMIN | UINT32_MAX |
| IMIN | INT32_MAX |
| UMAX | 0 |
| IMAX | INT32_MIN |
| AND | UINT32_MAX |
| OR | UINT32_MAX |
| XOR | 0 |

In this table, note that IMIN refers to a 32-bit signed integer minimum and UMIN refers to a 32-bit unsigned integer minimum.

Certain graphics workloads may utilize a substantial number of atomic without return operations. For example, certain renderers may perform the following procedure: generate geometry clusters during asset import, distribute geometry clusters in compressed form, compute cluster level of detail selection (e.g., to achieve a target average triangle size), cull clusters, route small-triangle clusters through a software rasterizer (e.g., writing to a pixel visibility buffer using atomic max without return), rasterize large-triangle clusters in hardware (e.g., also using atomics), and perform deferred material application. In this example workload, improvements to atomic performance may substantially affect overall performance, particularly if the renderer does not bin primitives into spatial tiles before rasterization (such that threadgroup atomics are not helpful to achieve performance scaling).

Atomic Smashing Overview

In some embodiments, cache control circuitry may accumulate results of multiple addition operations at a given cache level. For example, consider multiple atomic add instructions to the same location in memory. The first instruction adds 7, the second adds 5 and the third instruction adds 8 in this example (where the "first," "second," and "third" labels refer to the order in which the instructions are executed, which may be different than their program order). The location in memory had a value of 10 prior to execution of the three instructions in this example.

The control circuitry may add the input value of the first instruction to an identity value (0 for addition) and store the result (7) in a cache line. The control circuitry may then add the input value of the second instruction to the stored result and store the updated result (12) in the cache line. After execution of the third instruction, the accumulated result is 20.

In response to a flush event, the processor needs to add the accumulated result to the value at the location in memory. Therefore, the control circuitry may track the most-recently-performed operation (an add in this example) and cause that operation to be performed between the value of the location in memory and the accumulated result. This provides a coherent result for the three add operations of 30. This flush control may involve initiating a single transaction that identifies the operation to a higher level in a cache/memory hierarchy. Alternatively, this flush control may involve retrieving the value from the location in memory and locally performing the operation. As still another alternative, this may involve communicating with another cache in a distributed coherency scheme, e.g., using one or more snoop requests.

Examples of flush events include, without limitation: a request to access the location in memory that returns the value back to the program, eviction of the cache line for cache maintenance reasons, a time-out, a programmer-controlled disable bit on an atomic instruction, or a requested atomic operation that is not associative with prior smashed operations (which may be referred to herein as a conflict).

The control circuitry may also ensure that the accumulated operations satisfy certain criteria. The control circuitry may check the most-recent atomic operation to facilitate the determination whether the next operation can be accumulated. Example checks for smashing criteria include: checking for binary associativity algebraic operations, checking for relaxed memory ordering, checking that the requests do not have a return, checking for compatible data types, checking that the atomic operations access the same memory region (e.g., a cache line), etc.

Disclosed techniques may advantageously reduce bandwidth by reducing higher-level cache/memory accesses and may also directly increase performance by allowing smashed atomic operations to execute at a greater rate (relative to execution at the coherence point, snooping for every atomic request, etc.). Further disclosed techniques may facilitate performance scaling in graphics processor designs, e.g., when increasing the number of shaders/coherent caches at a given cache level.

Graphics Processing Overview

Referring to FIG. 1A, a flow diagram illustrating an example processing flow 100 for processing graphics data is shown. In some embodiments, transform and lighting procedure 110 may involve processing lighting information for vertices received from an application based on defined light source locations, reflectance, etc., assembling the vertices into polygons (e.g., triangles), and transforming the polygons to the correct size and orientation based on position in a three-dimensional space. Clip procedure 115 may involve discarding polygons or vertices that fall outside of a viewable area. In some embodiments, geometry processing may utilize object shaders and mesh shaders for flexibility and efficient processing prior to rasterization. Rasterize procedure 120 may involve defining fragments within each polygon and assigning initial color values for each fragment, e.g., based on texture coordinates of the vertices of the polygon. Fragments may specify attributes for pixels which they overlap, but the actual pixel attributes may be determined based on combining multiple fragments (e.g., in a frame buffer), ignoring one or more fragments (e.g., if they are covered by other objects), or both. Shade procedure 130 may involve altering pixel components based on lighting, shadows, bump mapping, translucency, etc. Shaded pixels may be assembled in a frame buffer 135. Modern GPUs typically include programmable shaders that allow customization of shading and other processing procedures by application developers. Thus, in various embodiments, the example elements of FIG. 1A may be performed in various orders, performed in parallel, or omitted. Additional processing procedures may also be implemented.

Figure 1B:
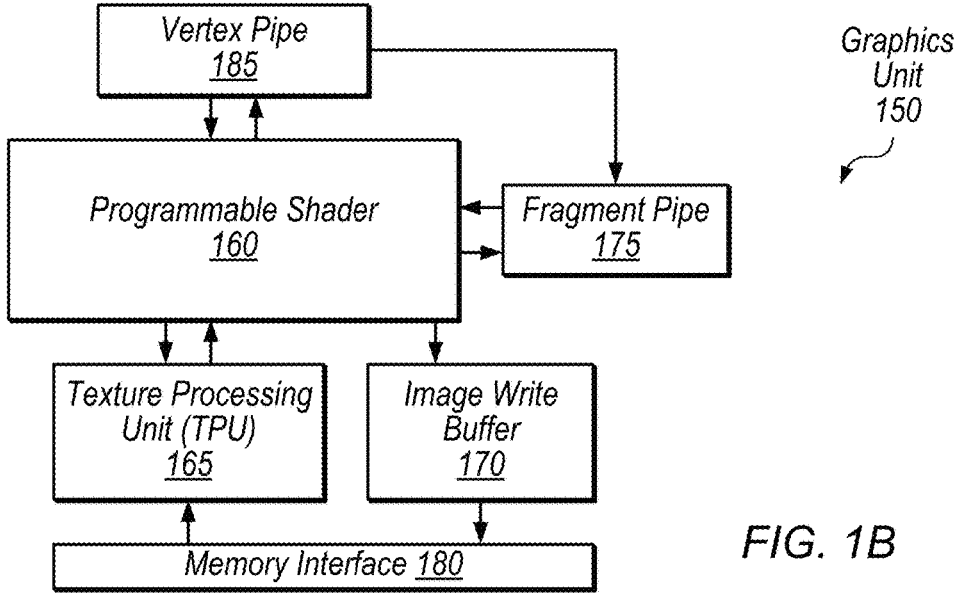
FIG. 1B is a block diagram illustrating an example graphics unit, according to some embodiments.

Referring now to FIG. 1B, a simplified block diagram illustrating a graphics unit 150 is shown, according to some embodiments. In the illustrated embodiment, graphics unit 150 includes programmable shader 160, vertex pipe 185, fragment pipe 175, texture processing unit (TPU) 165, image write buffer 170, and memory interface 180. In some embodiments, graphics unit 150 is configured to process both vertex and fragment data using programmable shader

160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with programmable shader 160 in order to coordinate vertex processing. In the illustrated embodiment, vertex pipe 185 is configured to send processed data to fragment pipe 175 or programmable shader 160 for further processing.

Fragment pipe 175, in the illustrated embodiment, may include various fixed-function hardware configured to process pixel data. Fragment pipe 175 may be configured to communicate with programmable shader 160 in order to coordinate fragment processing. Fragment pipe 175 may be configured to perform rasterization on polygons from vertex pipe 185 or programmable shader 160 to generate fragment data. Vertex pipe 185 and fragment pipe 175 may be coupled to memory interface 180 (coupling not shown) in order to access graphics data.

Programmable shader 160, in the illustrated embodiment, is configured to receive vertex data from vertex pipe 185 and fragment data from fragment pipe 175 and TPU 165. Programmable shader 160 may be configured to perform vertex processing tasks on vertex data which may include various transformations and adjustments of vertex data. Programmable shader 160, in the illustrated embodiment, is also configured to perform fragment processing tasks on pixel data such as texturing and shading, for example. Programmable shader 160 may include multiple sets of multiple execution pipelines for processing data in parallel.

In some embodiments, programmable shader includes pipelines configured to execute one or more different SIMD groups in parallel. Each pipeline may include various stages configured to perform operations in a given clock cycle, such as fetch, decode, issue, execute, etc. The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

The term "SIMD group" is intended to be interpreted according to its well-understood meaning, which includes a set of threads for which processing hardware processes the same instruction in parallel using different input data for the different threads. SIMD groups may also be referred to as SIMT (single-instruction, multiple-thread) groups, single instruction parallel thread (SIPT), or lane-stacked threads. Various types of computer processors may include sets of pipelines configured to execute SIMD instructions. For example, graphics processors often include programmable shader cores that are configured to execute instructions for a set of related threads in a SIMD fashion. Other examples of names that may be used for a SIMD group include: a wavefront, a clique, or a warp. A SIMD group may be a part of a larger threadgroup of threads that execute the same program, which may be broken up into a number of SIMD groups (within which threads may execute in lockstep) based on the parallel processing capabilities of a computer. In some embodiments, each thread is assigned to a hardware pipeline (which may be referred to as a "lane") that fetches operands for that thread and performs the specified operations in parallel with other pipelines for the set of threads. Note that processors may have a large number of pipelines such that multiple separate SIMD groups may also execute in parallel. In some embodiments, each thread has private operand storage, e.g., in a register file. Thus, a read of a particular register from the register file may provide the version of the register for each thread in a SIMD group.

As used herein, the term "thread" includes its well-understood meaning in the art and refers to sequence of program instructions that can be scheduled for execution independently of other threads. Multiple threads may be included in a SIMD group to execute in lock-step. Multiple threads may be included in a task or process (which may correspond to a computer program). Threads of a given task may or may not share resources such as registers and memory. Thus, context switches may or may not be performed when switching between threads of the same task.

In some embodiments, multiple programmable shader units 160 are included in a GPU. In these embodiments, global control circuitry may assign work to the different sub-portions of the GPU which may in turn assign work to shader cores to be processed by shader pipelines.

TPU 165, in the illustrated embodiment, is configured to schedule fragment processing tasks from programmable shader 160. In some embodiments, TPU 165 is configured to pre-fetch texture data and assign initial colors to fragments for further processing by programmable shader 160 (e.g., via memory interface 180). TPU 165 may be configured to provide fragment components in normalized integer formats or floating-point formats, for example. In some embodiments, TPU 165 is configured to provide fragments in groups of four (a "fragment quad") in a 2×2 format to be processed by a group of four execution pipelines in programmable shader 160.

Image write buffer 170, in some embodiments, is configured to store processed tiles of an image and may perform operations to a rendered image before it is transferred for display or to memory for storage. In some embodiments, graphics unit 150 is configured to perform tile-based deferred rendering (TBDR). In tile-based rendering, different portions of the screen space (e.g., squares or rectangles of pixels) may be processed separately. Memory interface 180 may facilitate communications with one or more of various memory hierarchies in various embodiments.

As discussed above, graphics processors typically include specialized circuitry configured to perform certain graphics processing operations requested by a computing system. This may include fixed-function vertex processing circuitry, pixel processing circuitry, or texture sampling circuitry, for example. Graphics processors may also execute non-graphics compute tasks that may use GPU shader cores but may not use fixed-function graphics hardware. As one example, machine learning workloads (which may include inference, training, or both) are often assigned to GPUs because of their parallel processing capabilities. Thus, compute kernels executed by the GPU may include program instructions that specify machine learning tasks such as implementing neural network layers or other aspects of machine learning models to be executed by GPU shaders. In some scenarios, non-graphics workloads may also utilize specialized graphics circuitry, e.g., for a different purpose than originally intended.

Further, various circuitry and techniques discussed herein with reference to graphics processors may be implemented in other types of processors in other embodiments. Other types of processors may include general-purpose processors such as CPUs or machine learning or artificial intelligence accelerators with specialized parallel processing capabilities. These other types of processors may not be configured to execute graphics instructions or perform graphics operations. For example, other types of processors may not include fixed-function hardware that is included in typical GPUs. Machine learning accelerators may include specialized hardware for certain operations such as implementing neural network layers or other aspects of machine learning models. Speaking generally, there may be design tradeoffs between the memory requirements, computation capabilities, power consumption, and programmability of machine learning accelerators. Therefore, different implementations may focus on different performance goals. Developers may select from among multiple potential hardware targets for a given machine learning application, e.g., from among generic processors, GPUs, and different specialized machine learning accelerators.

Example Atomic Smashing Control Circuitry

Figure 2:
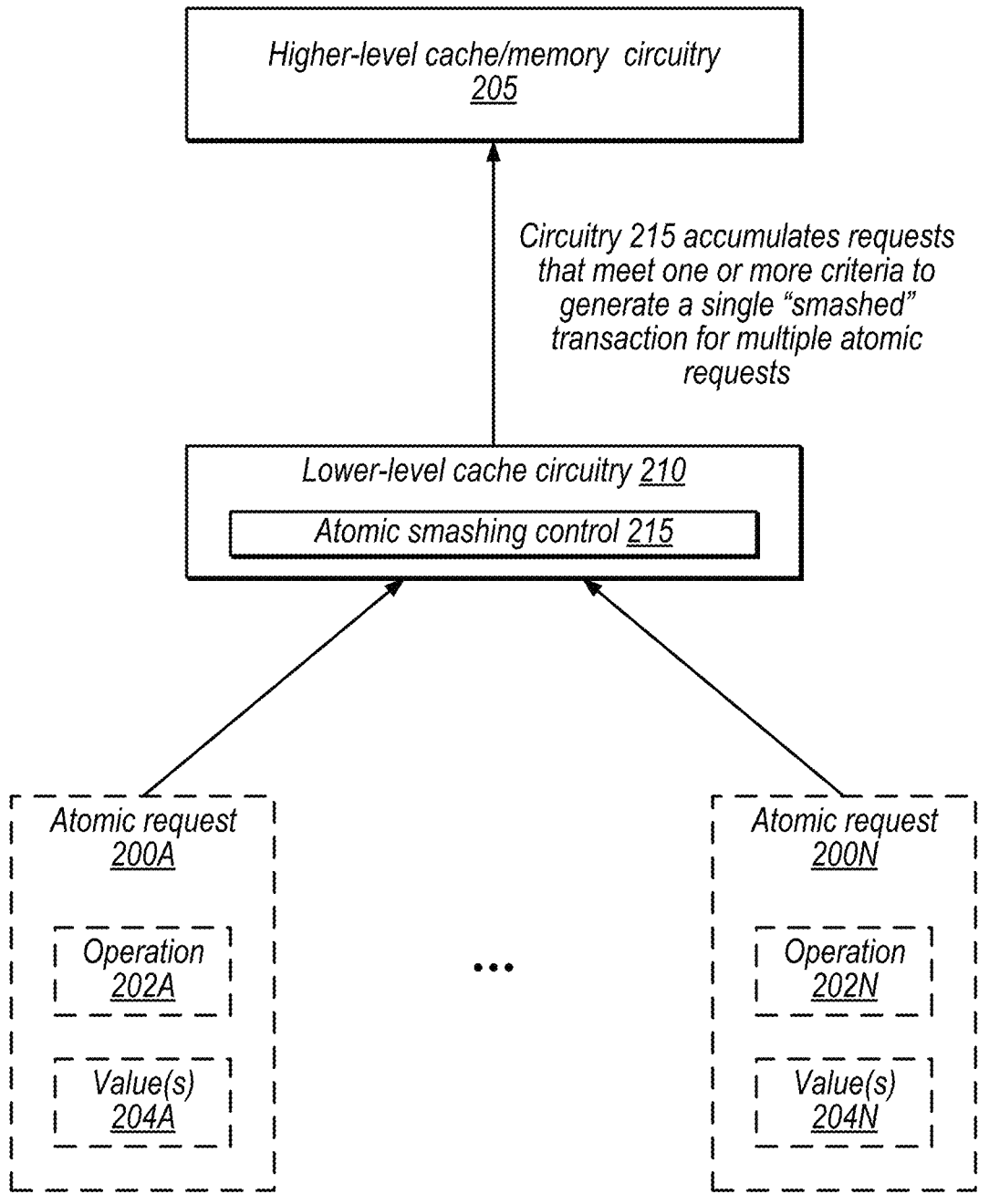
FIG. 2 is a block diagram illustrating example smashing of multiple atomic requests, according to some embodiments.

FIG. 2 is a block diagram illustrating example smashing of multiple atomic requests, according to some embodiments. In this illustrated embodiment, a processor includes lower-level cache circuitry 210 and higher-level cache/memory circuitry 205. As used herein, a "lower" cache level refers to a level that is closer to the underlying processor circuitry and a "higher" cache level refers to a level that is closer to a backing memory. Note that the hierarchy may include various other levels that are not shown.

Lower-level cache circuitry 210, in the illustrated embodiment, receives multiple atomic requests 200A-200N. For multiple requests to the same atomic region of memory, atomic smashing control circuitry 215 is configured to accumulate multiple requests that meet certain criteria. An example of an atomic region of memory is a cache line, although atomic regions of other granularities may be tracked in various embodiments. As shown, circuitry 215 may generate a single "smashed" transaction to higher-level cache/memory circuitry 205 for multiple atomic requests. This may advantageously reduce transactions to the higher-level circuitry 205, relative to sending separate transactions for each atomic request.

Higher-level cache/memory circuitry 205, in the illustrated embodiment, is configured to store data evicted from lower-level cache 210, in write-back embodiments. In other embodiments, circuitry 205 may implement write-through techniques. In some embodiments, circuitry 205 acts as a coherence point for multiple caches 210.

In some embodiments, circuitry 210 is a level one (L1) cache for a shader core and circuitry 205 is a level 2 (L2) cache shared by multiple shader cores. In other embodiments, circuitry 210 is an L2 cache in a multi-GPU system (potentially a multi-die system) and circuitry 205 is a memory cache shared by multiple L2 caches. These are non-limiting examples to show that the specific cache levels may vary in different embodiments.

Figure 3:
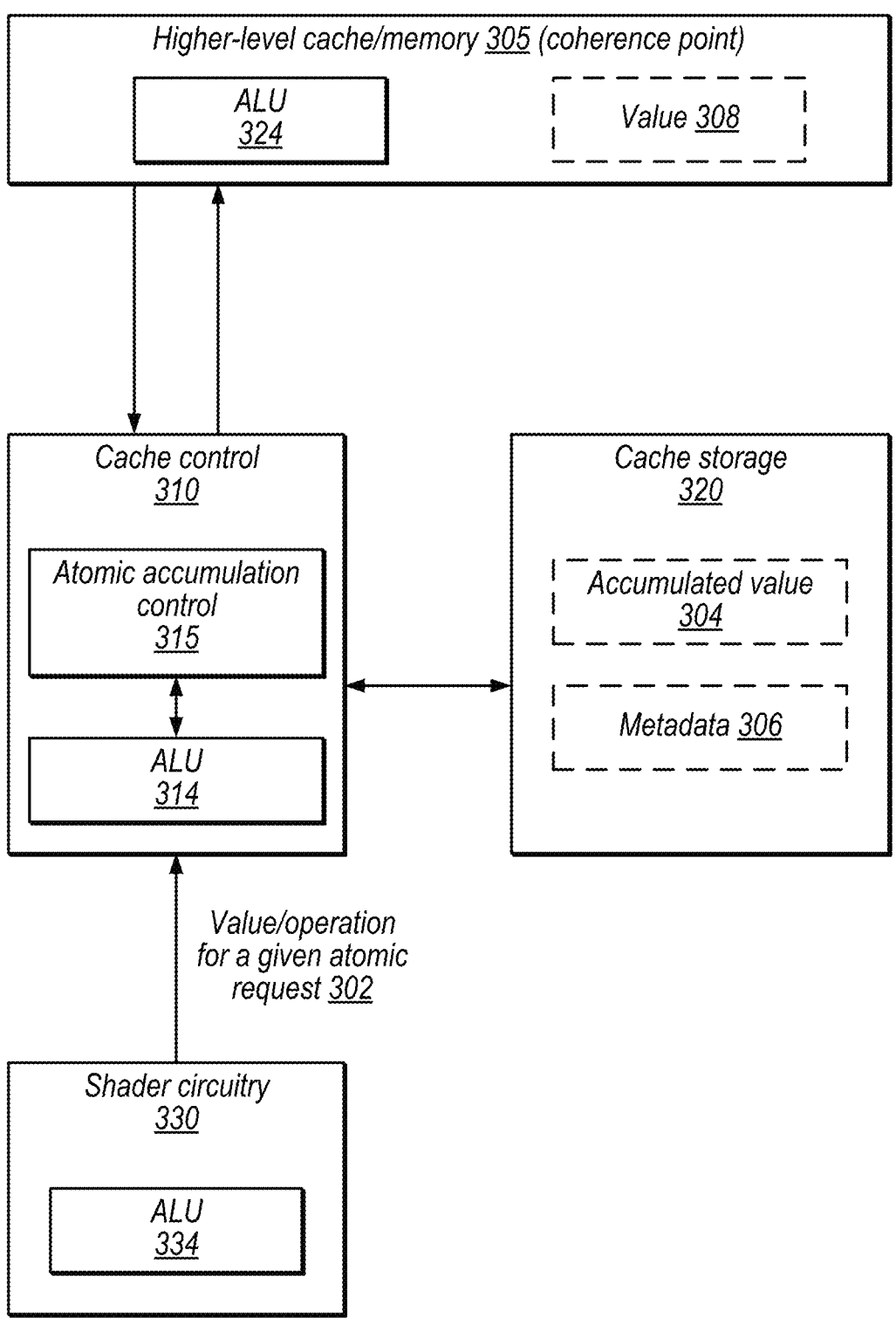
FIG. 3 is a more detailed block diagram illustrating example accumulation control circuitry configured to handle accumulated values and metadata for smashing, according to some embodiments.

FIG. 3 is a more detailed block diagram illustrating example accumulation control circuitry configured to handle accumulated values and metadata for smashing, according to some embodiments. In the illustrated example, a graphics processor includes higher-level cache/memory circuitry 305, cache control circuitry 310, cache storage circuitry 320, and shader circuitry 330. In some embodiments, circuitry 305 corresponds to circuitry 205 and circuitry 310 and 320 correspond to circuitry 210 of FIG. 2.

Shader circuitry 330, in some embodiments, is configured to execute instructions of shader programs. This may include forming and executing SIMD groups from threads of a given threadgroup. In some embodiments, cache storage 320 is an L1 cache for shader circuitry 330 (and the GPU may include multiple instances of shader circuitry 330 with corresponding L1 caches). In some embodiments, shader circuitry 330 includes execution pipelines with arithmetic logic unit (ALU) circuitry 334 configured to perform operations specified by certain instructions. For certain atomic instructions, however, shader circuitry 330 is configured to submit atomic requests to cache control 310 (e.g., request 302, which includes one or more values and an operation for the request) such that the operations are performed by cache control circuitry 310, rather than performing the operations internally in circuitry 330. In non-GPU embodiments, one or more processor pipelines (e.g., CPU pipelines) may access cache storage 320 via cache control 310, similarly to shader circuitry 330.

Cache control circuitry 310, in some embodiments, is configured to perform various operations for cache storage 320 (e.g., checking a content-addressable tag array for hits and misses, performing maintenance operations, selecting entries for eviction, etc.). In the illustrated embodiment, cache control 310 includes atomic accumulation control circuitry 315, which may be configured to handle various atomic smashing operations discussed herein, including performing and accumulating requested operations using ALU circuitry 314.

Cache storage 320, in some embodiments, is a random-access memory configured to store data for cache lines controlled by circuitry 310. In the illustrated example, atomic accumulation control circuitry 315 is configured to store accumulated values 304 from smashed atomics in cache storage 320 as well as metadata 306 (which may be stored in the cache line corresponding to the metadata or separately).

Metadata 306 may reflect various information about the accumulated value 304, as discussed in detail below with reference to FIG. 4. In various embodiments, metadata 306 indicates the most-recent operation performed to update the accumulated value 304. In some embodiments, metadata 306 also indicates whether a given line is an atomic line (a line for which one or more atomic requests have been locally aggregated).

Various operations may cause a "conflict" that halts atomic smashing (e.g., operations that trigger a flush to the coherence point). For example, an atomic request that does not meet atomic smashing criteria may cause a conflict. One example criterion is requested operations having a particular algebraic relationship with the prior operation (e.g., both operations are the same, both operations are in a set of commutative operations, etc.). Another example criterion is atomic requests having the same data type (or data types within a set of similar data types). There may also be other criteria such as a relaxed memory ordering mode, that the requests are "without return" (a request "with return" may trigger a flush), etc. Also, an external event such as an eviction or other cache maintenance operation may cause a flush.

Control 315 may include conflict check circuitry configured to allocate/evict cache lines and update cache lines as discussed above. Control 315 may implement a finite state machine, for example, that changes states based on various inputs such as the states of cache lines, replacement information, requested operations, etc. to perform various disclosed operations.

When there is a conflict, cache control circuitry 310 is configured to send accumulated value 304 and metadata 306 (or at least a portion thereof that indicates the most-recent operation) to higher-level circuitry 305. In some embodiments, cache control 310 then services the request that caused the conflict (e.g., populates accumulated value 304 with an identity value associated with the operation and updates metadata 306 to reflect the operation).

After the flush, circuitry 305 is configured to use ALU 324 to perform the operation indicated by the flushed metadata on the flushed accumulated value and the stored value 308. This may allow atomic smashing of subsequent operations that do not cause conflicts.

Figure 4:
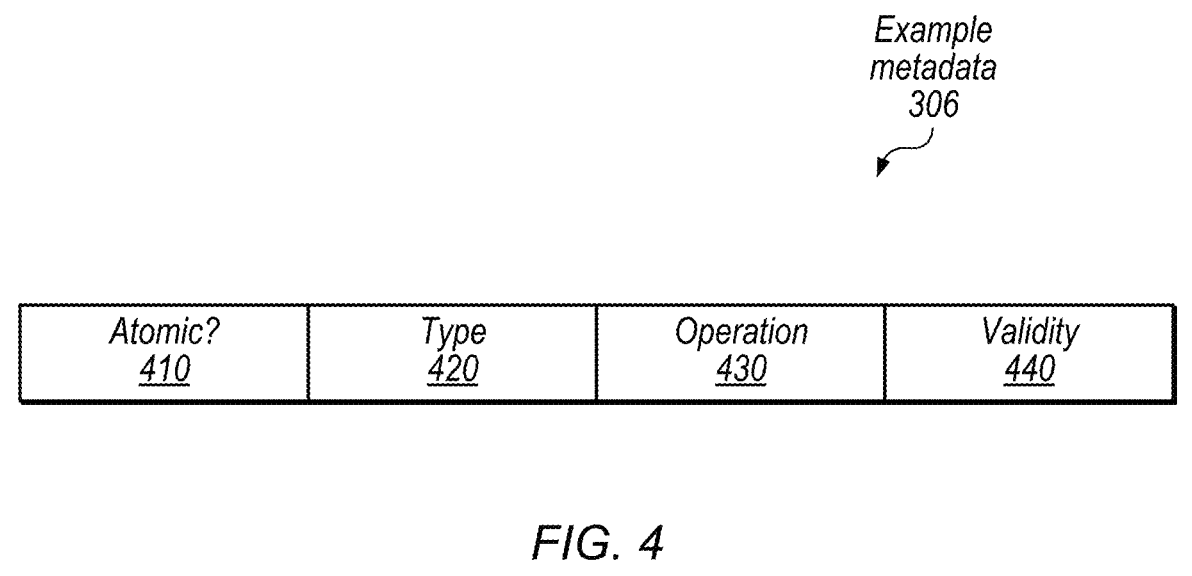

FIG. 4 is a diagram illustrating example fields of metadata 306, according to some embodiments. In the illustrated example, metadata for a region of memory (e.g., a cache line) includes atomic field 410, type field 420, operation field 430, and validity field 440. Atomic field 410 may indicate whether the memory region is an atomic region (e.g., whether an atomic request has been processed to update the region). Type field 420 may indicate the data type of the latest operation (e.g., 16-bit integer, 32-bit integer, 32-bit floating-point, 64-bit floating-point, etc.). Operation field 430 may indicate the most recent operation performed to the atomic region. Validity field 440 may indicate whether the metadata is valid. In some embodiments, the metadata 306 may also indicate a context ID, virtual address, etc. associated with the region of memory.

In some embodiments, metadata 306 is at least partially compressed before being written (potentially to the same storage location as the cache line data). For example, the illustrated fields may initially be encoded using N bits but may be stored using N-M bits after compression. The control circuitry may then decode the metadata 306 when retrieved.

In summary, for atomic without return requests in some embodiments, requests that miss in the cache cause allocation of a line in the cache, recording of the atomic operation in the metadata, and initialization of the value 304 to the identity value. Requests that hit cause a conflict check and a request that does not cause a conflict updates the cache line and metadata. On a conflict, control circuitry flushes the accumulated value and metadata, records the operation being performed by the incoming request, and initializes the value 304 to the identity value for the incoming operation.

Figure 5:
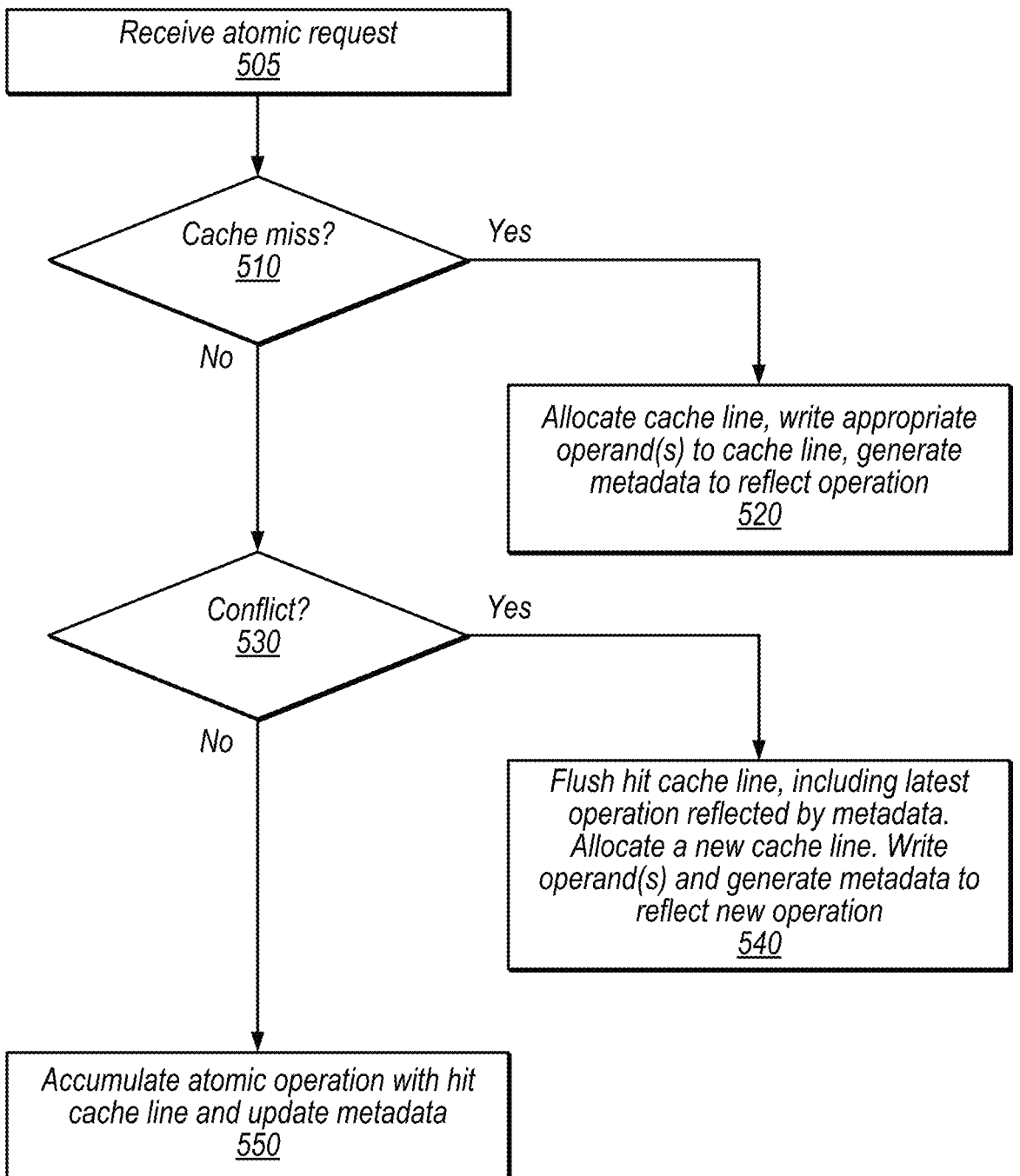
FIG. 5 is a flow diagram illustrating example cache operations for atomic requests, according to some embodiments.

FIG. 5 is a flow diagram illustrating this approach, according to some embodiments. At 505, in the illustrated example, cache control circuitry receives an atomic request. At 510, control circuitry determines whether there is a cache miss. If so, flow proceeds to 520 and the control circuitry allocates a cache line, writes appropriate operand(s) (e.g., an identity value) to the cache line, and generates metadata to reflect the operation. If there is a cache hit at 510, flow proceeds to 530 and control circuitry determines whether there is a conflict. If so, flow proceeds to 540 and control circuitry flushes the hit cache line (including the latest operation reflected by the metadata), allocates a new cache line, and writes operand(s) and generates metadata to reflect the new operation. If there is not a conflict at 530, flow proceeds to 550 and control circuitry accumulates the incoming operation with the hit cache line and updates the metadata (note that a metadata update may not be needed if the incoming operation is the same as the previous operation or encoded as being in the same set of operations as the previous operation).

For atomic with return requests, on a cache miss the control circuitry may forward the request to the coherence point (without allocating a cache line in cache storage 320).

On a cache hit, the control circuitry may perform a flush, invalidate the cached region (e.g., the cache line with accumulated value 304), and forward the incoming atomic request to the coherence point such that it is guaranteed to be processed in order with respect to the request generated by the flush. Therefore, a request to retrieve a coherent value (e.g., an atomic operation with return) may cause value 308 to reflect the coherent value before responding to the request.

Note that while various graphics processor embodiments are discussed herein, similar techniques may be used in other types of processors (e.g., CPUs, microcontrollers, etc.). GPU embodiments are therefore not intended to limit the scope of the present disclosure. To the extent that GPU-specific SIMD or threadgroup contexts are discussed herein, similar parallel processing techniques may be used in non-GPU processors.

Example with Conflict Resolution Below Coherence Point

In other embodiments, instead of flushing in response to a conflict, cache control 310 may retrieve value 308 from circuitry 305 and perform one or more operations locally to properly update accumulated value 304. For example, for a requested atomic multiply after a string of adds, cache control 310 may retrieve value 308, add that value to accumulated value 304, perform the multiply on the result to generate a new accumulated value 304, then update metadata 306 to reflect the multiply. In these embodiments, circuitry 305 may lock its corresponding cache line until the operations by cache control 310 are complete, to maintain coherence.

In other embodiments, rather than maintaining coherence at a centralized point, coherence may be maintained among multiple different caches at the same level, e.g., using snooping mechanisms. In these embodiments, cache control 310 may obtain ownership of the location (potentially retrieving dirty data from one or more other caches at the same level) before performing the incoming request that caused the conflict. More generally, the update relating to a conflict may be performed at the processor that caused the conflict (e.g., by retrieving a value from another cache, updating the value based on previous smashing, and performing the operation that caused the conflict) or by another processor (e.g., by sending the accumulated value, the previous operation performed, the new operation, and the new value to another processor). In these embodiments, smashing may substantially reduce snoops (e.g., because a given cache may smash multiple operations before needing to issue a snoop), which may improve performance by avoiding snoop latency, at least in certain situations.

Example Method

FIG. 6 is a flow diagram illustrating an example method for atomic smashing, according to some embodiments. The method shown in FIG. 6 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 610, in the illustrated embodiment, a computing device (e.g., cache control 310) caches data values in a cache storage (e.g., in cache circuitry 210).

At 620, in the illustrated embodiment, the computing device receives multiple requests to atomically update a cached data value according to one or more arithmetic operations. Some of the requests may be from different SIMD groups. Some of the requests may be from different threadgroups. Requests from different SIMD groups or threadgroups may correspond to different programs (e.g., shaders). The requests may arrive at different times while an atomic-smashed result is cached.

At 630, in the illustrated embodiment, the computing device performs updates to a cached data value based on the multiple requests, in response to determining that the one or more arithmetic operations meet one or more criteria. In some embodiments, the cache control circuitry for the cache storage includes one or more ALUs configured to perform the arithmetic operations. These ALUs may be distinct from ALUs in execution units of the processor pipeline, and may be configured to perform only a subset of arithmetic operations that the overall processor is configured to perform. The updates may be for atomic operations that do not request a return value (other atomic operations may cause a conflict).

The criteria may include one or more relationships between a current arithmetic operation and the most-recent requested atomic arithmetic operation (e.g., that the operations are the same operation, the operations are a set of operations (e.g., commutative operations), etc.), one or more relationships between data types, etc.

At 640, in the illustrated embodiment, the computing device stores operation information that indicates a most-recent requested atomic arithmetic operation for the updated data value. The device may store metadata that includes the operation information in a cache line with the corresponding updated data value. The metadata may also indicate: whether one or more values in the cache line correspond to atomic operations, one or more data types for one or more values in the cache line that correspond to atomic operations, valid indicators for different portions of the cache line, or some combination thereof. The device may maintain the metadata at cache line granularity.

At 650, in the illustrated embodiment, the computing device flushes, in response to an event, the following information to a higher level in a memory hierarchy that includes the cache storage circuitry: the updated data value and the operation information.

The event may be a cache eviction or a cache maintenance operation. The event may be a first request with a first arithmetic operation that does not meet the one or more criteria. Subsequent to the flush, the device may store, based on the first arithmetic operation, data in the cache storage circuitry for the first request (e.g., an algebraic identity value corresponding to the first arithmetic operation) and update the operation information to reflect the first arithmetic operation.

The higher level in the memory hierarchy may be a coherence point for the requests to atomically update the cached data value. The higher level may include circuitry (e.g., one or more ALUs) configured to perform the operation indicated by the flushed operation information on input values that include the updated data value and a data value stored in the higher level in the memory hierarchy.

The concept of "execution" is broad and may refer to 1) processing of an instruction throughout an execution pipeline (e.g., through fetch, decode, execute, and retire stages) and 2) processing of an instruction at an execution unit or execution subsystem of such a pipeline (e.g., an integer execution unit or a load-store unit). The latter meaning may also be referred to as "performing" the instruction. Thus, "performing" an add instruction refers to adding two operands to produce a result, which may, in some embodiments, be accomplished by a circuit at an execute stage of a pipeline (e.g., an execution unit). Conversely, "executing" the add instruction may refer to the entirety of operations that occur throughout the pipeline as a result of the add instruction. Similarly, "performing" a "load" instruction may include retrieving a value (e.g., from a cache, memory, or stored result of another instruction) and storing the retrieved value into a register or other location.

As used herein the terms "complete" and "completion" in the context of an instruction refer to commitment of the instruction's result(s) to the architectural state of a processor or processing element. For example, completion of an add instruction includes writing the result of the add instruction to a destination register. Similarly, completion of a load instruction includes writing a value (e.g., a value retrieved from a cache or memory) to a destination register or a representation thereof.

The concept of a processor "pipeline" is well understood, and refers to the concept of splitting the "work" a processor performs on instructions into multiple stages. In some embodiments, instruction decode, dispatch, execution (i.e., performance), and retirement may be examples of different pipeline stages. Many different pipeline architectures are possible with varying orderings of elements/portions. Various pipeline stages perform such steps on an instruction during one or more processor clock cycles, then pass the instruction or operations associated with the instruction on to other stages for further processing.

Example Device

Figure 7:
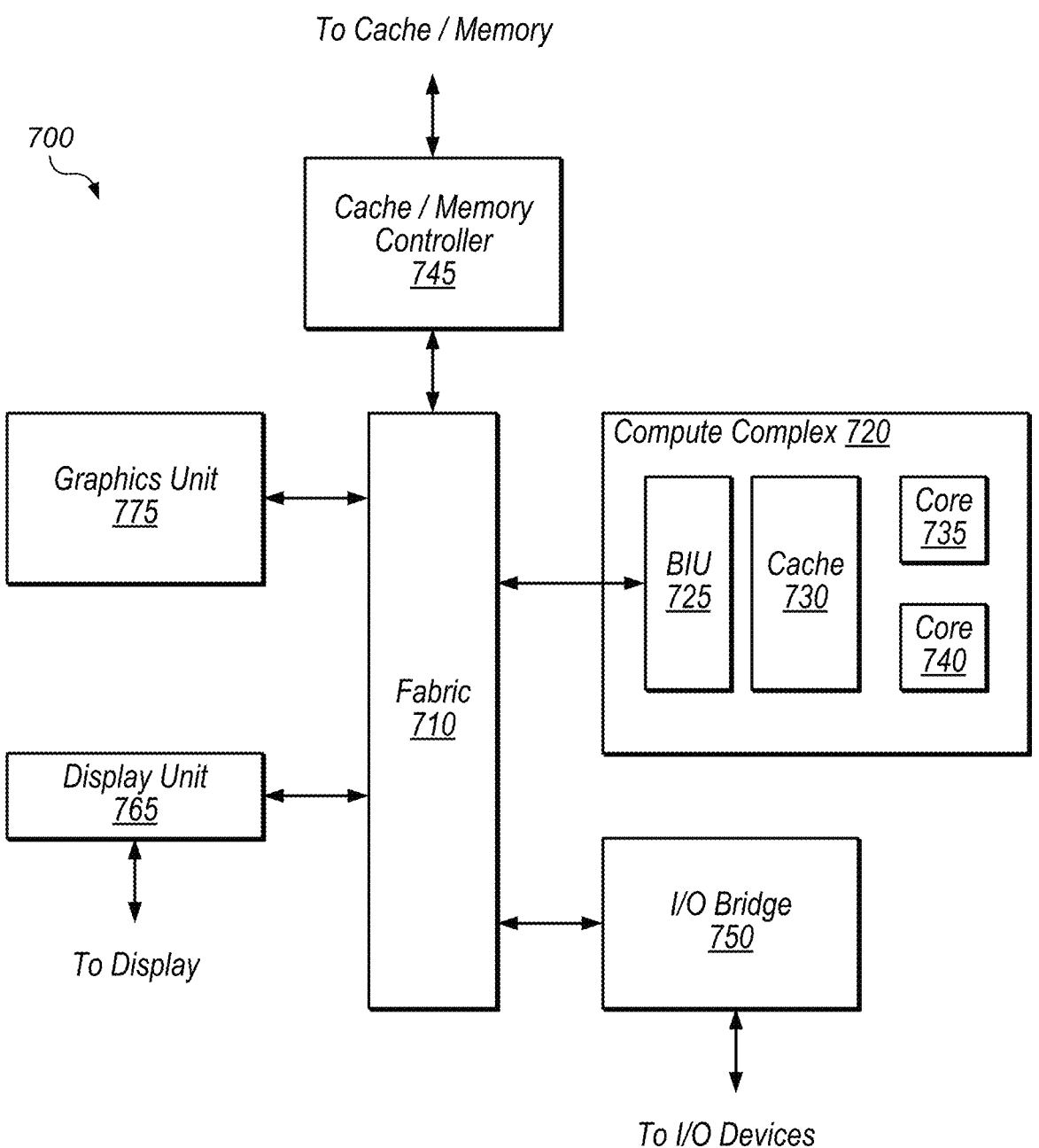
FIG. 7 is a block diagram illustrating an example computing device, according to some embodiments.

Referring now to FIG. 7, a block diagram illustrating an example embodiment of a device 700 is shown. In some embodiments, elements of device 700 may be included within a system on a chip. In some embodiments, device 700 may be included in a mobile device, which may be battery-powered. Therefore, power consumption by device 700 may be an important design consideration. In the illustrated embodiment, device 700 includes fabric 710, compute complex 720 input/output (I/O) bridge 750, cache/memory controller 745, graphics unit 775, and display unit 765. In some embodiments, device 700 may include other components (not shown) in addition to or in place of the illustrated components, such as video processor encoders and decoders, image processing or recognition elements, computer vision elements, etc.

Fabric 710 may include various interconnects, buses, MUX's, controllers, etc., and may be configured to facilitate communication between various elements of device 700. In some embodiments, portions of fabric 710 may be configured to implement various different communication protocols. In other embodiments, fabric 710 may implement a single communication protocol and elements coupled to fabric 710 may convert from the single communication protocol to other communication protocols internally.

In the illustrated embodiment, compute complex 720 includes bus interface unit (BIU) 725, cache 730, and cores 735 and 740. In various embodiments, compute complex 720 may include various numbers of processors, processor cores and caches. For example, compute complex 720 may include 1, 2, or 4 processor cores, or any other suitable number. In one embodiment, cache 730 is a set associative L2 cache. In some embodiments, cores 735 and 740 may include internal instruction and data caches. In some embodiments, a coherency unit (not shown) in fabric 710, cache 730, or elsewhere in device 700 may be configured to maintain coherency between various caches of device 700. BIU 725 may be configured to manage communication between compute complex 720 and other elements of device 700. Processor cores such as cores 735 and 740 may be configured to execute instructions of a particular instruction set architecture (ISA) which may include operating system instructions and user application instructions. These instructions may be stored in computer readable medium such as a memory coupled to memory controller 745 discussed below.

In some embodiments, compute complex 720 implements disclosed atomic smashing techniques, which may improve performance, reduce power consumption, or both.

As used herein, the term "coupled to" may indicate one or more connections between elements, and a coupling may include intervening elements. For example, in FIG. 7, graphics unit 775 may be described as "coupled to" a memory through fabric 710 and cache/memory controller 745. In contrast, in the illustrated embodiment of FIG. 7, graphics unit 775 is "directly coupled" to fabric 710 because there are no intervening elements.

Cache/memory controller 745 may be configured to manage transfer of data between fabric 710 and one or more caches and memories. For example, cache/memory controller 745 may be coupled to an L3 cache, which may in turn be coupled to a system memory. In other embodiments, cache/memory controller 745 may be directly coupled to a memory. In some embodiments, cache/memory controller 745 may include one or more internal caches. Memory coupled to controller 745 may be any type of volatile memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR4, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with an integrated circuit in a chip-on-chip configuration, a package-on-package configuration, or a multi-chip module configuration. Memory coupled to controller 745 may be any type of non-volatile memory such as NAND flash memory, NOR flash memory, nano RAM (NRAM), magneto-resistive RAM (MRAM), phase change RAM (PRAM), Racetrack memory, Memristor memory, etc. As noted above, this memory may store program instructions executable by compute complex 720 to cause the computing device to perform functionality described herein.

Graphics unit 775 may include one or more processors, e.g., one or more graphics processing units (GPU's). Graphics unit 775 may receive graphics-oriented instructions, such as OPENGL®, Metal, or DIRECT3D® instructions, for example. Graphics unit 775 may execute specialized GPU instructions or perform other operations based on the received graphics-oriented instructions. Graphics unit 775 may generally be configured to process large blocks of data in parallel and may build images in a frame buffer for output to a display, which may be included in the device or may be a separate device. Graphics unit 775 may include transform, lighting, triangle, and rendering engines in one or more graphics processing pipelines. Graphics unit 775 may output pixel information for display images. Graphics unit 775, in various embodiments, may include programmable shader circuitry which may include highly parallel execution cores configured to execute graphics programs, which may include pixel tasks, vertex tasks, and compute tasks (which may or may not be graphics-related).

In some embodiments, graphics unit 775 implements disclosed atomic smashing techniques, which may improve performance, reduce power consumption, or both.

Display unit 765 may be configured to read data from a frame buffer and provide a stream of pixel values for display. Display unit 765 may be configured as a display pipeline in some embodiments. Additionally, display unit 765 may be configured to blend multiple frames to produce an output frame. Further, display unit 765 may include one or more interfaces (e.g., MIPI® or embedded display port (eDP)) for coupling to a user display (e.g., a touchscreen or an external display).

I/O bridge 750 may include various elements configured to implement: universal serial bus (USB) communications, security, audio, and low-power always-on functionality, for example. I/O bridge 750 may also include interfaces such as pulse-width modulation (PWM), general-purpose input/output (GPIO), serial peripheral interface (SPI), and inter-integrated circuit (I2C), for example. Various types of peripherals and devices may be coupled to device 700 via I/O bridge 750.

In some embodiments, device 700 includes network interface circuitry (not explicitly shown), which may be connected to fabric 710 or I/O bridge 750. The network interface circuitry may be configured to communicate via various networks, which may be wired, wireless, or both. For example, the network interface circuitry may be configured to communicate via a wired local area network, a wireless local area network (e.g., via Wi-Fi™), or a wide area network (e.g., the Internet or a virtual private network). In some embodiments, the network interface circuitry is configured to communicate via one or more cellular networks that use one or more radio access technologies. In some embodiments, the network interface circuitry is configured to communicate using device-to-device communications (e.g., Bluetooth® or Wi-Fi™ Direct), etc. In various embodiments, the network interface circuitry may provide device 700 with connectivity to various types of other devices and networks.

Example Applications

Figure 8:
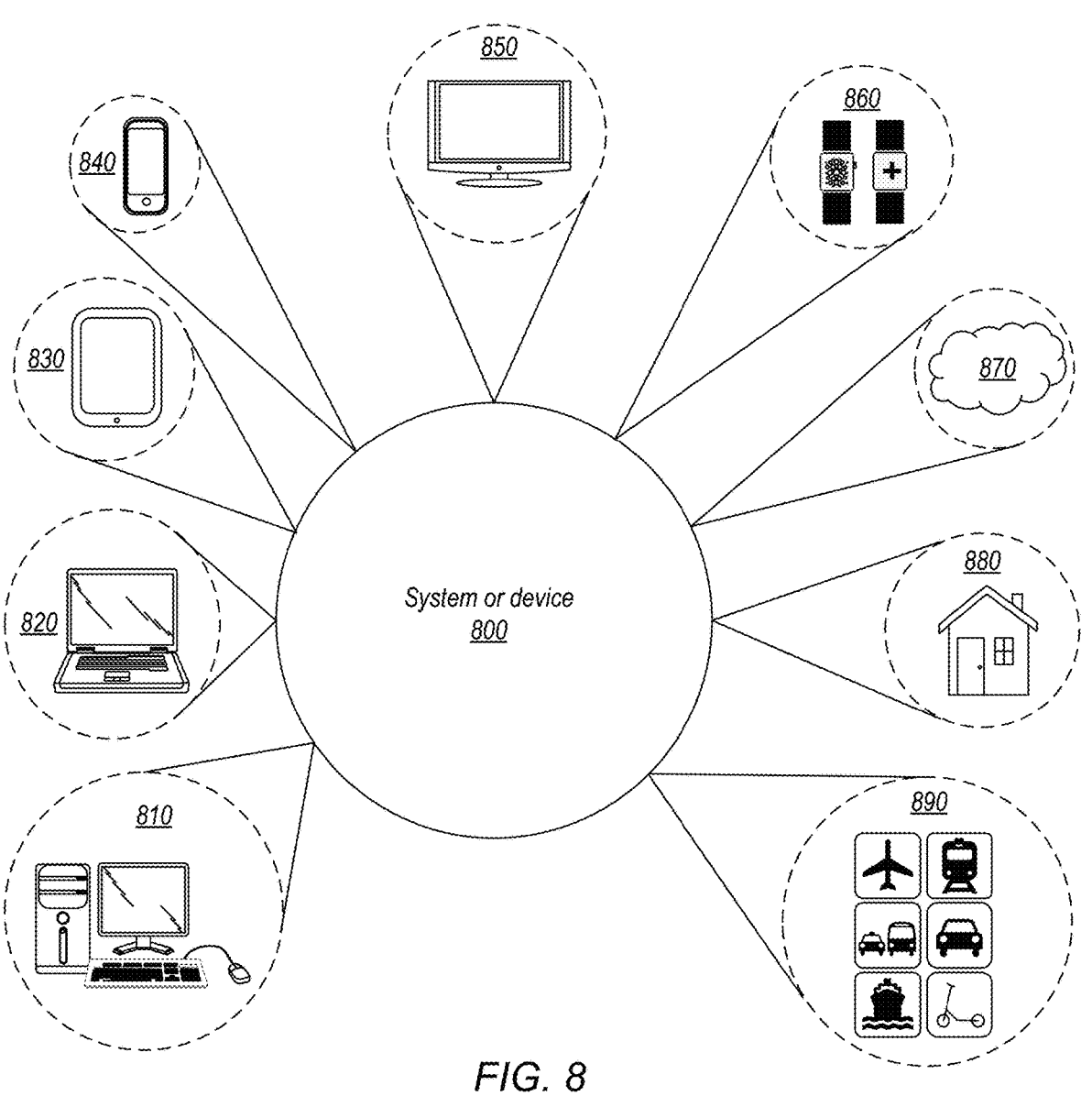
FIG. 8 is a diagram illustrating example applications of disclosed systems and devices, according to some embodiments.

Turning now to FIG. 8, various types of systems that may include any of the circuits, devices, or system discussed above. System or device 800, which may incorporate or otherwise utilize one or more of the techniques described herein, may be utilized in a wide range of areas. For example, system or device 800 may be utilized as part of the hardware of systems such as a desktop computer 810, laptop computer 820, tablet computer 830, cellular or mobile phone 840, or television 850 (or set-top box coupled to a television).

Similarly, disclosed elements may be utilized in a wearable device 860, such as a smartwatch or a health-monitoring device. Smartwatches, in many embodiments, may implement a variety of different functions—for example, access to email, cellular service, calendar, health monitoring, etc. A wearable device may also be designed solely to perform health-monitoring functions, such as monitoring a user's vital signs, performing epidemiological functions such as contact tracing, providing communication to an emergency medical service, etc. Other types of devices are also contemplated, including devices worn on the neck, devices implantable in the human body, glasses or a helmet designed to provide computer-generated reality experiences such as those based on augmented and/or virtual reality, etc.

System or device 800 may also be used in various other contexts. For example, system or device 800 may be utilized in the context of a server computer system, such as a dedicated server or on shared hardware that implements a cloud-based service 870. Still further, system or device 800 may be implemented in a wide range of specialized every-day devices, including devices 880 commonly found in the home such as refrigerators, thermostats, security cameras, etc. The interconnection of such devices is often referred to as the "Internet of Things" (IoT). Elements may also be implemented in various modes of transportation. For example, system or device 800 could be employed in the control systems, guidance systems, entertainment systems, etc. of various types of vehicles 890.

The applications illustrated in FIG. 8 are merely exemplary and are not intended to limit the potential future applications of disclosed systems or devices. Other example applications include, without limitation: portable gaming devices, music players, data storage devices, unmanned aerial vehicles, etc.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a computing system configured to generate a simulation model of the hardware circuit, by a fabrication system configured to produce hardware (e.g., an integrated circuit) that includes the disclosed circuitry, etc. Claims to such a storage medium are intended to cover, for example, an entity that produces a circuit design, but does not itself perform complete operations such as: design simulation, design synthesis, circuit fabrication, etc.

Figure 9:
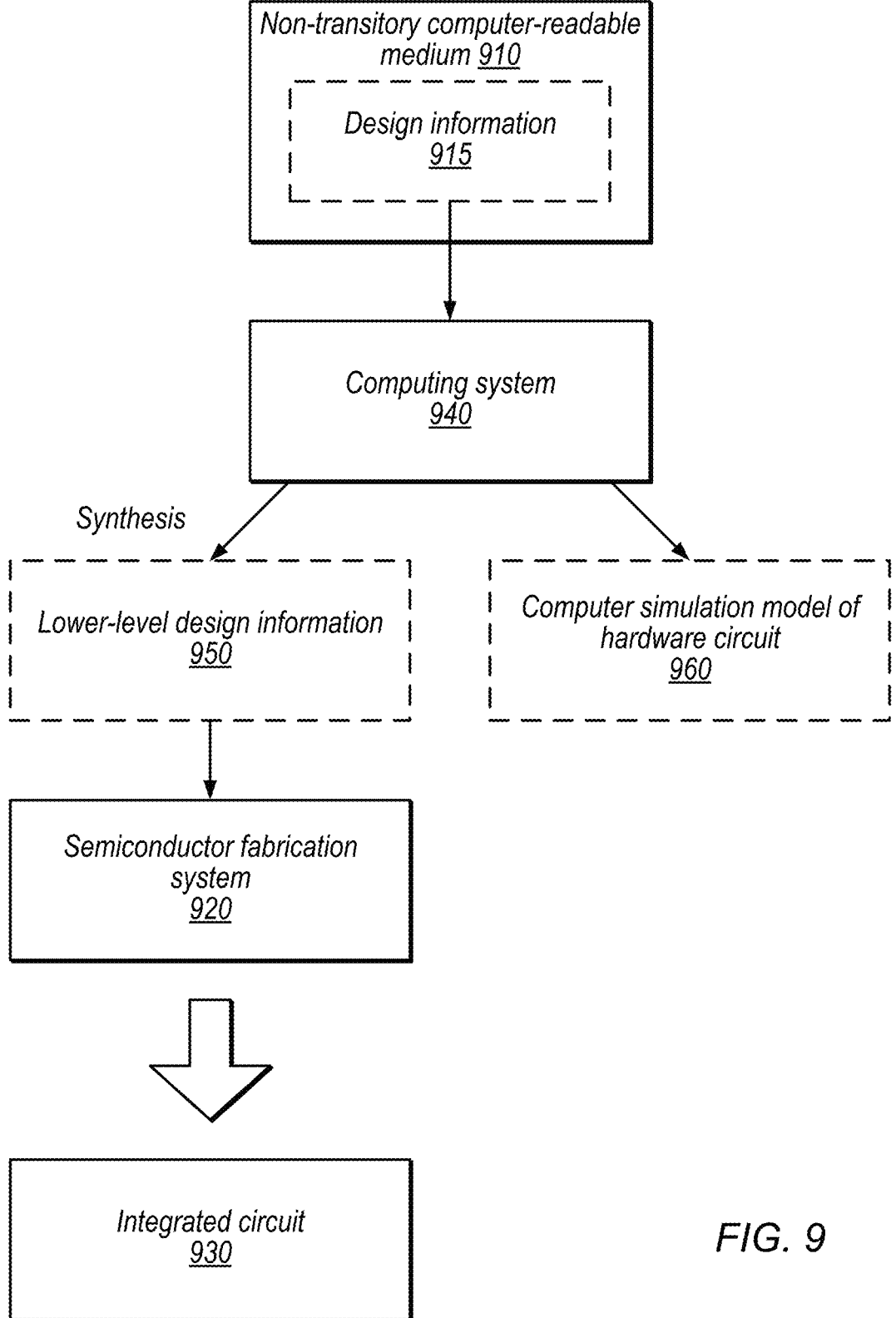
FIG. 9 is a block diagram illustrating an example computer-readable medium that stores circuit design information, according to some embodiments.

FIG. 9 is a block diagram illustrating an example non-transitory computer-readable storage medium that stores circuit design information, according to some embodiments. In the illustrated embodiment, computing system 940 is configured to process the design information. This may include executing instructions included in the design information, interpreting instructions included in the design information, compiling, transforming, or otherwise updating the design information, etc. Therefore, the design information controls computing system 940 (e.g., by programming computing system 940) to perform various operations discussed below, in some embodiments.

In the illustrated example, computing system 940 processes the design information to generate both a computer simulation model of a hardware circuit 960 and lower-level design information 950. In other embodiments, computing system 940 may generate only one of these outputs, may generate other outputs based on the design information, or both. Regarding the computing simulation, computing system 940 may execute instructions of a hardware description language that includes register transfer level (RTL) code, behavioral code, structural code, or some combination thereof. The simulation model may perform the functionality specified by the design information, facilitate verification of the functional correctness of the hardware design, generate power consumption estimates, generate timing estimates, etc.

In the illustrated example, computing system 940 also processes the design information to generate lower-level design information 950 (e.g., gate-level design information, a netlist, etc.). This may include synthesis operations, as shown, such as constructing a multi-level network, optimizing the network using technology-independent techniques, technology dependent techniques, or both, and outputting a network of gates (with potential constraints based on available gates in a technology library, sizing, delay, power, etc.). Based on lower-level design information 950 (potentially among other inputs), semiconductor fabrication system 920 is configured to fabricate an integrated circuit 930 (which may correspond to functionality of the simulation model 960). Note that computing system 940 may generate different simulation models based on design information at various levels of description, including information 950, 915, and so on. The data representing design information 950 and model 960 may be stored on medium 910 or on one or more other media.

In some embodiments, the lower-level design information 950 controls (e.g., programs) the semiconductor fabrication system 920 to fabricate the integrated circuit 930. Thus, when processed by the fabrication system, the design information may program the fabrication system to fabricate a circuit that includes various circuitry disclosed herein.

Non-transitory computer-readable storage medium 910, may comprise any of various appropriate types of memory devices or storage devices. Non-transitory computer-readable storage medium 910 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 910 may include other types of non-transitory memory as well or combinations thereof. Accordingly, non-transitory computer-readable storage medium 910 may include two or more memory media; such media may reside in different locations—for example, in different computer systems that are connected over a network.

Design information 915 may be specified using any of various appropriate computer languages, including hardware description languages such as, without limitation: VHDL, Verilog, SystemC, System Verilog, RHDL, M, MyHDL, etc. The format of various design information may be recognized by one or more applications executed by computing system 940, semiconductor fabrication system 920, or both. In some embodiments, design information may also include one or more cell libraries that specify the synthesis, layout, or both of integrated circuit 930. In some embodiments, the design information is specified in whole or in part in the form of a netlist that specifies cell library elements and their connectivity. Design information discussed herein, taken alone, may or may not include sufficient information for fabrication of a corresponding integrated circuit. For example, design information may specify the circuit elements to be fabricated but not their physical layout. In this case, design information may be combined with layout information to actually fabricate the specified circuitry.

Integrated circuit 930 may, in various embodiments, include one or more custom macrocells, such as memories, analog or mixed-signal circuits, and the like. In such cases, design information may include information related to included macrocells. Such information may include, without limitation, schematics capture database, mask design data, behavioral models, and device or transistor level netlists. Mask design data may be formatted according to graphic data system (GDSII), or any other suitable format.

Semiconductor fabrication system 920 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 920 may also be configured to perform various testing of fabricated circuits for correct operation.

In various embodiments, integrated circuit 930 and model 960 are configured to operate according to a circuit design specified by design information 915, which may include performing any of the functionality described herein. For example, integrated circuit 930 may include any of various elements shown in FIGS. 1B, 2-3, and 7. Further, integrated circuit 930 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components. Similarly, stating "instructions of a hardware description programming language" that are "executable" to program a computing system to generate a computer simulation model" does not imply that the instructions must be executed in order for the element to be met, but rather specifies characteristics of the instructions. Additional features relating to the model (or the circuit represented by the model) may similarly relate to characteristics of the instructions, in this context. Therefore, an entity that sells a computer-readable medium with instructions that satisfy recited characteristics may provide an infringing product, even if another entity actually executes the instructions on the medium.

Note that a given design, at least in the digital logic context, may be implemented using a multitude of different gate arrangements, circuit technologies, etc. Once a digital logic design is specified, however, those skilled in the art need not perform substantial experimentation or research to determine those implementations. Rather, those of skill in the art understand procedures to reliably and predictably produce one or more circuit implementations that provide the function described by the design information. The different circuit implementations may affect the performance, area, power consumption, etc. of a given design (potentially with tradeoffs between different design goals), but the logical function does not vary among the different circuit implementations of the same circuit design.

In some embodiments, the instructions included in the design information instructions provide RTL information (or other higher-level design information) and are executable by the computing system to synthesize a gate-level netlist that represents the hardware circuit based on the RTL information as an input. Similarly, the instructions may provide behavioral information and be executable by the computing system to synthesize a netlist or other lower-level design information. The lower-level design information may program fabrication system 920 to fabricate integrated circuit 930.

The various techniques described herein may be performed by one or more computer programs. The term "program" is to be construed broadly to cover a sequence of instructions in a programming language that a computing device can execute. These programs may be written in any suitable computer language, including lower-level languages such as assembly and higher-level languages such as Python. The program may be written in a compiled language such as C or C++, or an interpreted language such as JavaScript.

Program instructions may be stored on a "computer-readable storage medium" or a "computer-readable medium" in order to facilitate execution of the program instructions by a computer system. Generally speaking, these phrases include any tangible or non-transitory storage or memory medium. The terms "tangible" and "non-transitory" are intended to exclude propagating electromagnetic signals, but not to otherwise limit the type of storage medium. Accordingly, the phrases "computer-readable storage medium" or a "computer-readable medium" are intended to cover types of storage devices that do not necessarily store information permanently (e.g., random access memory (RAM)). The term "non-transitory," accordingly, is a limitation on the nature of the medium itself (i.e., the medium cannot be a signal) as opposed to a limitation on data storage persistency of the medium (e.g., RAM vs. ROM).

The phrases "computer-readable storage medium" and "computer-readable medium" are intended to refer to both a storage medium within a computer system as well as a removable medium such as a CD-ROM, memory stick, or portable hard drive. The phrases cover any type of volatile memory within a computer system including DRAM, DDR RAM, SRAM, EDO RAM, Rambus RAM, etc., as well as non-volatile memory such as magnetic media, e.g., a hard drive, or optical storage. The phrases are explicitly intended to cover the memory of a server that facilitates downloading of program instructions, the memories within any intermediate computer system involved in the download, as well as the memories of all destination computing devices. Still further, the phrases are intended to cover combinations of different types of memories.

In addition, a computer-readable medium or storage medium may be located in a first set of one or more computer systems in which the programs are executed, as well as in a second set of one or more computer systems which connect to the first set over a network. In the latter instance, the second set of computer systems may provide program instructions to the first set of computer systems for execution. In short, the phrases "computer-readable storage medium" and "computer-readable medium" may include two or more media that may reside in different locations, e.g., in different computers that are connected over a network.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more of the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" or is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g., passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

The invention claimed is:

1. An apparatus, comprising:
cache storage circuitry that includes a first cache; and
cache control circuitry configured to:
    cache data values in the first cache;
    receive multiple requests to atomically update a cached data value according to one or more arithmetic operations;
    perform updates to a cached data value based on the multiple requests, in response to determining that the one or more arithmetic operations meet one or more criteria;
    store operation information that indicates a most-recent requested atomic arithmetic operation for the updated data value; and
    in response to an event, synchronize with one or more other caches in a memory hierarchy that includes the first cache, based on:
        the updated data value; and
        the operation information.

2. The apparatus of claim 1, wherein the synchronization includes to flush the updated data value and the operation information to a higher level in the memory hierarchy.

3. The apparatus of claim 2, wherein:
the higher level in the memory hierarchy is a coherence point for the requests to atomically update the cached data value; and
the higher level in the memory hierarchy includes circuitry configured to perform the operation indicated by the flushed operation information on input values that include the updated data value and a data value stored in the higher level in the memory hierarchy.

4. The apparatus of claim 1, wherein the synchronization includes to:
retrieve a value from another level in the memory hierarchy; and
perform the operation on the updated data value and the retrieved value.

5. The apparatus of claim 4, wherein the cache control circuitry is configured to lock a cache line corresponding to the value in conjunction with the retrieval and performance of the operation.

6. The apparatus of claim 1, wherein the synchronization includes to:

communicate the updated data value and the operation information via one or more snoop messages.

7. The apparatus of claim 6, wherein the synchronization includes to:
retrieve dirty data from another cache at a same level in the memory hierarchy as the first cache.

8. The apparatus of claim 6, wherein the synchronization includes to send, to another cache at a same level in the memory hierarchy as the first cache:
the updated data value;
the operation information;
information indicating an operation that triggered the event; and
a value for the operation that triggered the event.

9. The apparatus of claim 1, wherein the cache control circuitry includes arithmetic logic unit circuitry configured to perform the arithmetic operations.

10. The apparatus of claim 1, wherein:
the event is a first request with a first arithmetic operation that does not meet the one or more criteria; and
the cache control circuitry is further configured to, subsequent to the synchronization:
store, based on the first arithmetic operation, data in the first cache for the first request; and
update the operation information to reflect the first arithmetic operation.

11. The apparatus of claim 1, the cache control circuitry is configured to store metadata that includes the operation information in a cache line with the corresponding updated data value.

12. The apparatus of claim 11, wherein the metadata further indicates:
whether one or more values in the cache line correspond to atomic operations;
one or more data types for one or more values in the cache line that correspond to atomic operations; and
valid indicators for different portions of the cache line.

13. The apparatus of claim 1, wherein the event is a cache eviction or a cache maintenance operation.

14. The apparatus of claim 1, wherein at least some of the multiple requests are from different single-instruction multiple-data (SIMD) groups.

15. The apparatus of claim 1, wherein at least some of the multiple requests are from different threadgroups corresponding to different programs.

16. A method, comprising:
caching, by a computing system, data values in a first cache;
receiving, by the computing system, multiple requests to atomically update a cached data value according to one or more arithmetic operations;
performing, by the computing system, updates to a cached data value based on the multiple requests, in response to determining that the one or more arithmetic operations meet one or more criteria;
storing, by the computing system, operation information that indicates a most-recent requested atomic arithmetic operation for the updated data value; and
synchronizing, by the computing system in response to an event, with one or more other caches in a memory hierarchy that includes the first cache, based on:
the updated data value; and
the operation information.

17. The method of claim 16, wherein the synchronizing includes:
flushing the updated data value and the operation information to a higher level in the memory hierarchy.

18. The method of claim 16, wherein the synchronizing includes:

retrieving a value from another level in the memory hierarchy; and performing the operation on the updated data value and the retrieved value.

19. The method of claim 16, wherein the synchronizing includes:

communicating the updated data value and the operation information via one or more snoop messages.

20. A non-transitory computer-readable medium having instructions of a hardware description programming language stored thereon that, when processed by a computing system, program the computing system to generate a computer simulation model, wherein the model represents a hardware circuit that includes:

cache storage circuitry that includes a first cache; and cache control circuitry configured to:

cache data values in the first cache;

receive multiple requests to atomically update a cached data value according to one or more arithmetic operations;

perform updates to a cached data value based on the multiple requests, in response to determining that the one or more arithmetic operations meet one or more criteria;

store operation information that indicates a most-recent requested atomic arithmetic operation for the updated data value; and in response to an event, synchronize with one or more other caches in a memory hierarchy that includes the first cache, based on:

the updated data value; and the operation information.

* * * * *